UNITED STATES PATENT OFFICE.

JAMES H. SPEARS, KENNEDY WELLS, AND ROBERT WELLS, OF PIPER CITY, ILLINOIS.

IMPROVEMENT IN CORN-HARVESTERS.

Specification forming part of Letters Patent No. 139,623, dated June 3, 1873; application filed April 19, 1873.

*To all whom it may concern:*

Be it known that we, JAMES H. SPEARS, KENNEDY WELLS, and ROBERT WELLS, of Piper City, in the county of Ford and State of Illinois, have invented a new and useful Improvement in Combined Corn Harvester and Husker, of which the following is a specification:

Figure 1 is a vertical longitudinal section of our improved machine, taken through the line $x\,x$, Fig. 2. Fig. 2 is a top view of the same. Fig. 3 is a plan view of a portion of the elevator-belt. Fig. 4 is an edge view of the same.

Similar letters of reference indicate corresponding parts.

Our invention has for its object, to furnish an improved machine, simple in construction, convenient in use, and effective in operation, detaching the ears from the stalks, removing the husks from the ears, and depositing the husked ears in a wagon.

The invention consists in the combination of a carrier, toothed rollers, elevator, and spouts, with guides and corrugated rollers, as herein described.

A is the tongue, which is connected with the short axle B, upon the journals of which revolve the small wheels C. D is the main frame of the machine which is connected with the axle B by a king-bolt, the head-block being made so deep that the side bars of the frame D may be directly above the wheels C. The frame D, a little in the rear of its middle part, is attached to the rear axle E, near one end. F are the rear wheels which revolve upon the journals of the axle E. The rear part of the frame D, at the side farthest from a drive-wheel, F, is made with an offset, G, the side bar of which is secured to and projects a little beyond the axle E. To the forward end of the side-bar of the offset G, and to the side-bar of the frame D, is secured a cross-bar, H, to which are attached the ends of the shanks of the three guides or gatherers I. The central guide I, is made in the form of a square pyramid placed diagonally, and with its lower edge rounded off as shown in Fig. 1, to enable it to pass over obstructions. The side-guides I, are made in the form of the halves of square pyramids, arranged with their straight sides outward, and vertical, and having their lower edges rounded off. J are rollers arranged parallel with each other, in pairs, and upon the opposite sides of the shank of the central guide I. The rollers J have spiral threads or corrugations upon their lower or forward ends, the corrugations of the rollers of each pair running in opposite directions, as shown in Fig. 2. These threads or corrugations extend longitudinally along the upper or rear part of the said rollers. The forward end of the inner roller of each pair is pivoted to the shoulder or base of the central guide I, and the forward end of the outer roller is pivoted to the shoulder or base of the outer guide. The rear ends of the rollers J, are pivoted to the cross-bar H, or to the flanged rear ends of the shanks of the guides I. To the rear journals of the rollers of each pair are attached small gear-wheels, K, meshing into each other, so that the rollers of each pair may be revolved together with equal velocity, and in opposite directions. The journals of the inner rollers are extended to the rearward, and have small bevel gear-wheels L, attached to their ends, the teeth of which mesh into the teeth of the small bevel gear-wheels M, attached to the shaft N, which revolves in bearings attached to the frame-work D G. To the shaft N, is attached a gear-wheel O, the teeth of which mesh into the teeth of a gear-wheel P, placed upon the shaft Q, and provided with a clutch R, and clutch-lever S, so that it may be thrown into and out of the gear with the gear-wheel O, as required. The shaft Q, revolves in bearings attached to the frame-work D G, and to its end is attached a gear or cog-wheel T, the teeth of which mesh into a gear or cog wheel U, attached to the drive-wheel F. V is an endless carrier which passes around a roller pivoted in a slot in the lower part of the shank of the central guide I, and around a roller attached to the shaft N, and by which the said carrier is driven. The carrier V, receives the ears of corn from the rollers J, carries them up and discharges them into the inclined spout W, down which they slide to the rollers X. The rollers X, are provided with short teeth arranged spirally, which tear off

UNITED STATES PATENT OFFICE.

JAMES H. SPEARS, KENNEDY WELLS, AND ROBERT WELLS, OF PIPER CITY, ILLINOIS.

IMPROVEMENT IN CORN-HARVESTERS.

Specification forming part of Letters Patent No. 139,623, dated June 3, 1873; application filed April 19, 1873.

*To all whom it may concern:*

Be it known that we, JAMES H. SPEARS, KENNEDY WELLS, and ROBERT WELLS, of Piper City, in the county of Ford and State of Illinois, have invented a new and useful Improvement in Combined Corn Harvester and Husker, of which the following is a specification:

Figure 1 is a vertical longitudinal section of our improved machine, taken through the line *x x*, Fig. 2. Fig. 2 is a top view of the same. Fig. 3 is a plan view of a portion of the elevator-belt. Fig. 4 is an edge view of the same.

Similar letters of reference indicate corresponding parts.

Our invention has for its object, to furnish an improved machine, simple in construction, convenient in use, and effective in operation, detaching the ears from the stalks, removing the husks from the ears, and depositing the husked ears in a wagon.

The invention consists in the combination of a carrier, toothed rollers, elevator, and spouts, with guides and corrugated rollers, as herein described.

A is the tongue, which is connected with the short axle B, upon the journals of which revolve the small wheels C. D is the main frame of the machine which is connected with the axle B by a king-bolt, the head-block being made so deep that the side bars of the frame D may be directly above the wheels C. The frame D, a little in the rear of its middle part, is attached to the rear axle E, near one end. F are the rear wheels which revolve upon the journals of the axle E. The rear part of the frame D, at the side farthest from a drive-wheel, F, is made with an offset, G, the side bar of which is secured to and projects a little beyond the axle E. To the forward end of the side-bar of the offset G, and to the side-bar of the frame D, is secured a cross-bar, H, to which are attached the ends of the shanks of the three guides or gatherers I. The central guide I, is made in the form of a square pyramid placed diagonally, and with its lower edge rounded off as shown in Fig. 1, to enable it to pass over obstructions. The side-guides I, are made in the form of the halves of square pyramids, arranged with their straight sides outward, and vertical, and having their lower edges rounded off. J are rollers arranged parallel with each other, in pairs, and upon the opposite sides of the shank of the central guide I. The rollers J have spiral threads or corrugations upon their lower or forward ends, the corrugations of the rollers of each pair running in opposite directions, as shown in Fig. 2. These threads or corrugations extend longitudinally along the upper or rear part of the said rollers. The forward end of the inner roller of each pair is pivoted to the shoulder or base of the central guide I, and the forward end of the outer roller is pivoted to the shoulder or base of the outer guide. The rear ends of the rollers J, are pivoted to the cross-bar H, or to the flanged rear ends of the shanks of the guides I. To the rear journals of the rollers of each pair are attached small gear-wheels, K, meshing into each other, so that the rollers of each pair may be revolved together with equal velocity, and in opposite directions. The journals of the inner rollers are extended to the rearward, and have small bevel gear-wheels L, attached to their ends, the teeth of which mesh into the teeth of the small bevel gear-wheels M, attached to the shaft N, which revolves in bearings attached to the frame-work D G. To the shaft N, is attached a gear-wheel O, the teeth of which mesh into the teeth of a gear-wheel P, placed upon the shaft Q, and provided with a clutch R, and clutch-lever S, so that it may be thrown into and out of the gear with the gear-wheel O, as required. The shaft Q, revolves in bearings attached to the frame-work D G, and to its end is attached a gear or cog-wheel T, the teeth of which mesh into a gear or cog wheel U, attached to the drive-wheel F. V is an endless carrier which passes around a roller pivoted in a slot in the lower part of the shank of the central guide I, and around a roller attached to the shaft N, and by which the said carrier is driven. The carrier V, receives the ears of corn from the rollers J, carries them up and discharges them into the inclined spout W, down which they slide to the rollers X. The rollers X, are provided with short teeth arranged spirally, which tear off the husks from the ears, and at the same time carry said ears along and discharge them upon the elevator Y, which passes around rollers pivoted to the upper and lower ends of the elevator frame Z, and discharges the husked ears into a hinged spout A', down which they slide into a wagon. To the forward ends of the rollers X, are attached gear-wheels B', one of which, or a bevel gear-wheel rigidly connected with it, mesh into a gear-wheel C', attached to the shaft D', to which shaft is also attached a gear-wheel E', which meshes into the gear-wheel O. To the projecting rear end of the journal of one of the rollers X, is attached a gear-wheel F', which meshes into a gear-wheel G', attached to the projecting end of the journal of the lower roller of the elevator Y. H' is the driver's seat, the standards I, of which are attached to the axle E or frame D.

The endless elevator and carrier belts may be chains formed of wire-loops J', and made with upwardly projecting loops K', as shown in Figs. 3 and 4.

Having thus described our invention, we claim as new and desire to secure by Letters Patent—

1. The combination of the carrier V, inclined spout W, toothed rollers X, elevator Y, and spout A', with each other and with the guides I, and threaded or corrugated rollers J, for removing the husks from the ears, and depositing the husked ears in a wagon, substantially as herein shown and described.

JAMES H. SPEARS.
KENNEDY WELLS.
ROBERT WELLS.

Witnesses:
HUGH P. BEACH,
WILLIAM P. McCLOED.